(12) United States Patent
Kimura et al.

(10) Patent No.: US 9,953,252 B2
(45) Date of Patent: Apr. 24, 2018

(54) PRINTER, PRINTING METHOD, AND NON-TRANSITORY COMPUTER READABLE MEDIUM

(71) Applicant: FUJI XEROX CO., LTD., Tokyo (JP)

(72) Inventors: Hosana Kimura, Kanagawa (JP); Noriyuki Suzumura, Kanagawa (JP); Kazuya Takahashi, Kanagawa (JP); Shinichi Takano, Kanagawa (JP); Kazutoshi Kondo, Kanagawa (JP); Daichi Takahashi, Kanagawa (JP); Yuta Nakayama, Kanagawa (JP); Chiemi Miyata, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/217,432

(22) Filed: Jul. 22, 2016

(65) Prior Publication Data
US 2017/0249537 A1    Aug. 31, 2017

(30) Foreign Application Priority Data
Feb. 26, 2016 (JP) ................. 2016-035875

(51) Int. Cl.
*G06K 15/00* (2006.01)
*G06K 15/02* (2006.01)

(52) U.S. Cl.
CPC ....... *G06K 15/404* (2013.01); *G06K 15/1802* (2013.01)

(58) Field of Classification Search
CPC .......................... G06K 15/404; G06K 15/1802

USPC ....................................................... 358/1.15
See application file for complete search history.

(56) References Cited

U.S. PATENT DOCUMENTS

| | | | | |
|---|---|---|---|---|
| 6,671,066 | B1* | 12/2003 | Aikawa | G06K 15/00 358/1.1 |
| 6,873,426 | B1* | 3/2005 | Farrell | B42C 19/00 270/52.02 |
| 9,507,547 | B1* | 11/2016 | Dennison | G06F 3/121 |
| 2012/0081736 | A1* | 4/2012 | Pinney | G06F 3/1205 358/1.15 |
| 2013/0229690 | A1* | 9/2013 | Sumita | H04N 1/00127 358/1.15 |
| 2014/0118765 | A1* | 5/2014 | Yang | G03G 15/5004 358/1.13 |

(Continued)

FOREIGN PATENT DOCUMENTS

JP     2000-043362 A     2/2000

*Primary Examiner* — Allen H Nguyen
(74) *Attorney, Agent, or Firm* — Oliff PLC

(57) ABSTRACT

A printer includes a receiver, an inserter, and a sort controller. The receiver receives print data. In response to detection of a change in a reception condition for receiving the print data by the receiver, the inserter inserts separator information between a print data portion received before the detection and a print data portion received after the detection, and thereby generates print data including the separator information inserted thereinto. In response to detection of the separator information from the print data including the separator information inserted thereinto that is sequentially input from the inserter, the sort controller performs control to sort a printout of a print data portion after the detected separator information from a printout of a print data portion before the detected separator information.

3 Claims, 3 Drawing Sheets

(56) References Cited

U.S. PATENT DOCUMENTS

| | | | | |
|---|---|---|---|---|
| 2014/0204416 A1* | 7/2014 | Kuroyanagi | ....... | H04N 1/00408 358/1.15 |
| 2014/0320880 A1* | 10/2014 | Kotsuji | ............ | H04N 1/00838 358/1.13 |
| 2016/0255231 A1* | 9/2016 | Sakata | ............... | H04N 1/00933 358/1.12 |

* cited by examiner

PRINTER, PRINTING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-035875 filed Feb. 26, 2016.

BACKGROUND (i) Technical Field

The present invention relates to a printer, a printing method, and a non-transitory computer readable medium.

(ii) Related Art

In the case of printing plural copies of a document, if a memory built in a printer has a sufficiently large capacity, a printer driver of a client apparatus (for example, a personal computer) may transmit print data of the document and information representing the number of copies to the printer. The printer holds the received print data in the built-in memory and repeatedly performs a process on the print data the same number of times as the number of copies, so as to print the copies of the document. If the amount of print data of the document is larger than the capacity of the built-in memory of the printer, this method is not employed. In this case, the printer driver repeatedly transmits the print data to the printer the same number of times as the number of copies, so as to print the copies of the document.

Many printers have a function of sorting a printout in units of copies or jobs. An example of a widely used sorting function is a function of performing sorting by shifting a paper output tray right and left in units of copies or jobs. Also, some of compact printers that do not have a mechanism of shifting a paper output tray have a function of performing sorting in units of copies by changing the orientation of paper for a printout to portrait or landscape in units of copies.

In the case of repeatedly transmitting print data the same number of times as the number of copies from the printer driver to the printer and in the case of sorting a print result in units of copies, it is necessary for the printer to detect a separator of each copy of the print data that is continuously transmitted thereto.

SUMMARY

According to an aspect of the invention, there is provided a printer including a receiver, an inserter, and a sort controller. The receiver receives print data. In response to detection of a change in a reception condition for receiving the print data by the receiver, the inserter inserts separator information between a print data portion received before the detection and a print data portion received after the detection, and thereby generates print data including the separator information inserted thereinto. In response to detection of the separator information from the print data including the separator information inserted thereinto that is sequentially input from the inserter, the sort controller performs control to sort a printout of a print data portion after the detected separator information from a printout of a print data portion before the detected separator information.

BRIEF DESCRIPTION OF THE DRAWINGS

An exemplary embodiment of the present invention will be described in detail based on the following figures, wherein.

DETAILED DESCRIPTION

Figure 1:
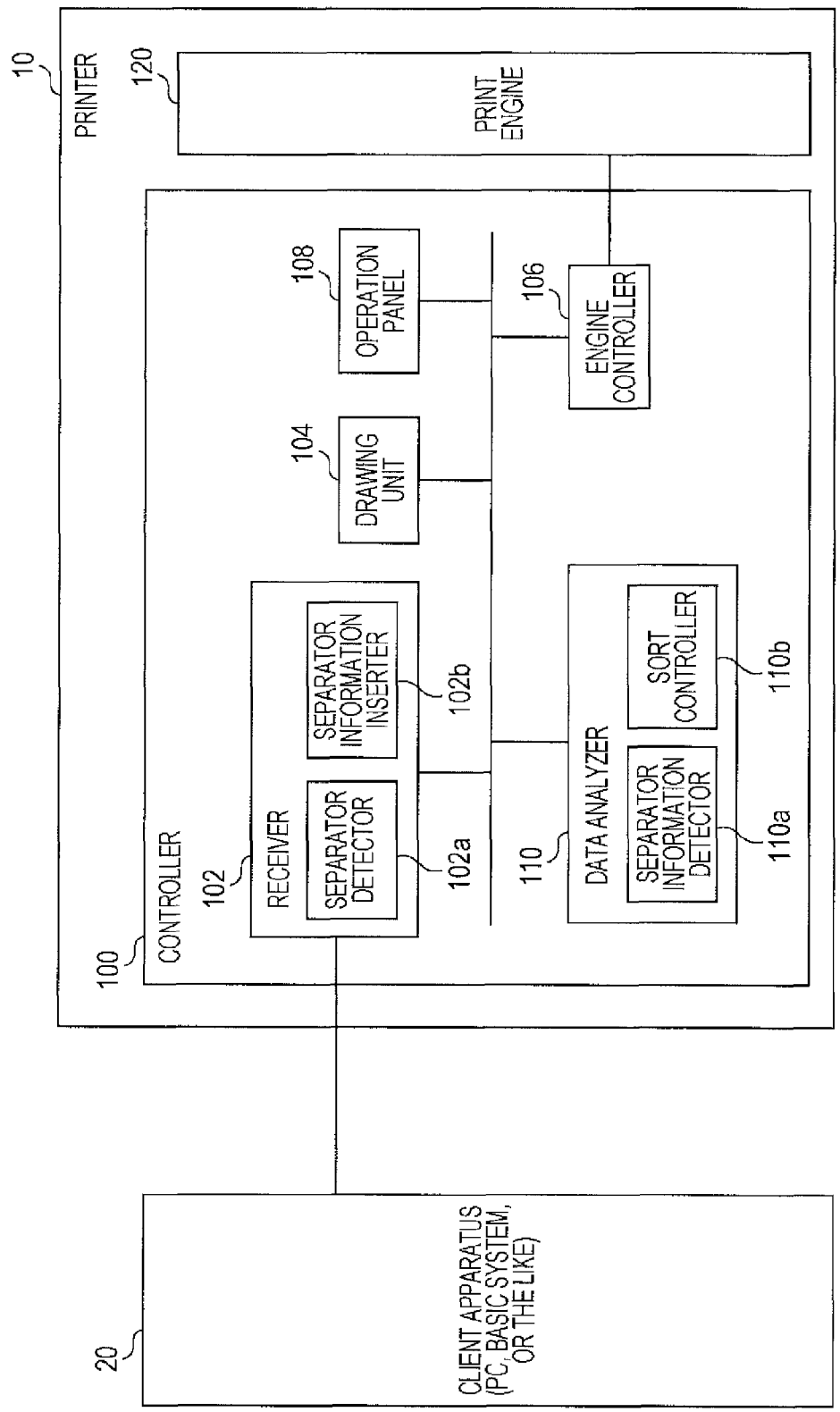
FIG. 1 is a diagram illustrating an example of the configurations of apparatuses according to an exemplary embodiment.

A printer according to an exemplary embodiment of the present invention will be described below with reference to FIG. 1. A printer 10 illustrated below is an apparatus that does not have a sorting function based on a shift operation of a paper output tray and that carries out sorting by changing the orientation of paper to be used in units of copies (or in units of jobs). The orientation of paper may be portrait orientation or landscape orientation of paper on a paper feed tray. The terms "short edge feed (SEF)" and "long edge feed (LEF)" may be used instead of "portrait" and "landscape", respectively.

The printer 10 according to the exemplary embodiment includes a controller 100 and a print engine 120. The print engine 120 is a mechanical device that prints an image on paper by using a coloring material such as ink or toner. The controller 100 is a control device that controls the print engine 120. The controller 100 receives print data from a client apparatus 20, such as a personal computer (PC) or a basic system, and causes the print engine 120 to print an image represented by the print data. The basic system generates a bill or other forms by using information stored in various databases and instructs the printer 10 to print the forms, for example.

The controller 100 includes a receiver 102, a drawing unit 104, an engine controller 106, an operation panel 108, and a data analyzer 110.

The receiver 102 receives print data transmitted by the client apparatus 20. The print data is described in a page description language (PDL). If the client apparatus 20 is a PC, a printer driver (not illustrated) installed in the PC converts a document designated by a user as a target to be printed into print data described in the PDL and transmits the print data to the controller 100. At this time, the printer driver includes, in a top portion of each job or each copy (one of plural copies to be printed), a specific command that does not appear in a portion describing a page image that follows the top portion. The specific command is used to set a print condition or the like of a job or copy. On the other hand, many basic systems generate and output PDL print data without using a printer driver. The specific command described at the top of each job or each copy by the printer driver may be unnecessary for the print data generated by the basic system. In such a case, it is not uncommon that the specific command is not included in the print data generated by the basic system.

The client apparatus 20 may have a function of obtaining performance information from the printer 10 at the beginning of printing and, if the performance information satisfies a certain condition (for example, the memory capacity is equal to or smaller than a threshold) and if the number of copies to be printed is plural, repeatedly transmitting the print data to the printer 10 the same number of times as the number of copies. In this case, the receiver 102 repeatedly receives the print data from the client apparatus 20 the same number of times as the number of copies.

The receiver 102 includes a separator detector 102a and a separator information inserter 102b. The separator detector 102a detects a separator in print data in response to a change in a reception condition for receiving print data from the client apparatus 20. The "reception condition" includes a state where print data is being received or not being received, a session with the client apparatus 20 for receiving print data, a reception port used to receive print data, and so forth. The separator information inserter 102b inserts separator information into received print data when the separator detector 102a detects a separator. As the separator information, special information (for example, a character string) that is not usually used in the PDL describing the print data is used. Which information is to be used as separator information may be defined within the controller 100, for example. The receiver 102 provides the data analyzer 110 with print data into which separator information has been inserted by the separator information inserter 102b (such print data is referred to as "print data with separator"). The print data with separator is print data into which separator information has been inserted at the position corresponding to a detected separator in the PDL print data received from the client apparatus 20. The details of processes performed by the separator detector 102a and the separator information inserter 102b will be described below.

The data analyzer 110 analyzes the print data with separator provided from the receiver 102 (and accompanying print setting data if any). As a result of the analysis, the data analyzer 110 determines print settings, for example, the size and orientation of paper to be used for printing, which of single-sided printing and double-sided printing is to be performed, and so forth, and reports the determined print settings to the engine controller 106. The data analyzer 110 according to the exemplary embodiment includes a separator information detector 110a and a sort controller 110b in addition to the above-described typical function. The separator information detector 110a detects separator information from the print data with separator. The sort controller 110b performs control that is necessary for sorting a printout in accordance with the detection of the separator information by the separator information detector 110a. The details of processes performed by the separator information detector 110a and the sort controller 110b will be described below.

The drawing unit 104 interprets the print data and thereby generates print image data of individual pages. An analysis result obtained from the data analyzer 110 may be used to interpret the print data.

The engine controller 106 causes the print engine 120 to print the print image data generated by the drawing unit 104. Here, the engine controller 106 designates, with respect to the print engine 120, the paper feed tray to be used as a paper feeding source in accordance with the print settings determined by the data analyzer 110. The print engine 120 prints the image data received from the engine controller 106 on the paper fed from the paper feed tray designated by the engine controller 106.

The operation panel 108 is a user interface mechanism for local operations of the printer 10 and includes devices, such as a screen that displays information representing the operation status of the printer 10 and so forth, and a button and touch panel that receive input of instructions from a user.

Figure 2:
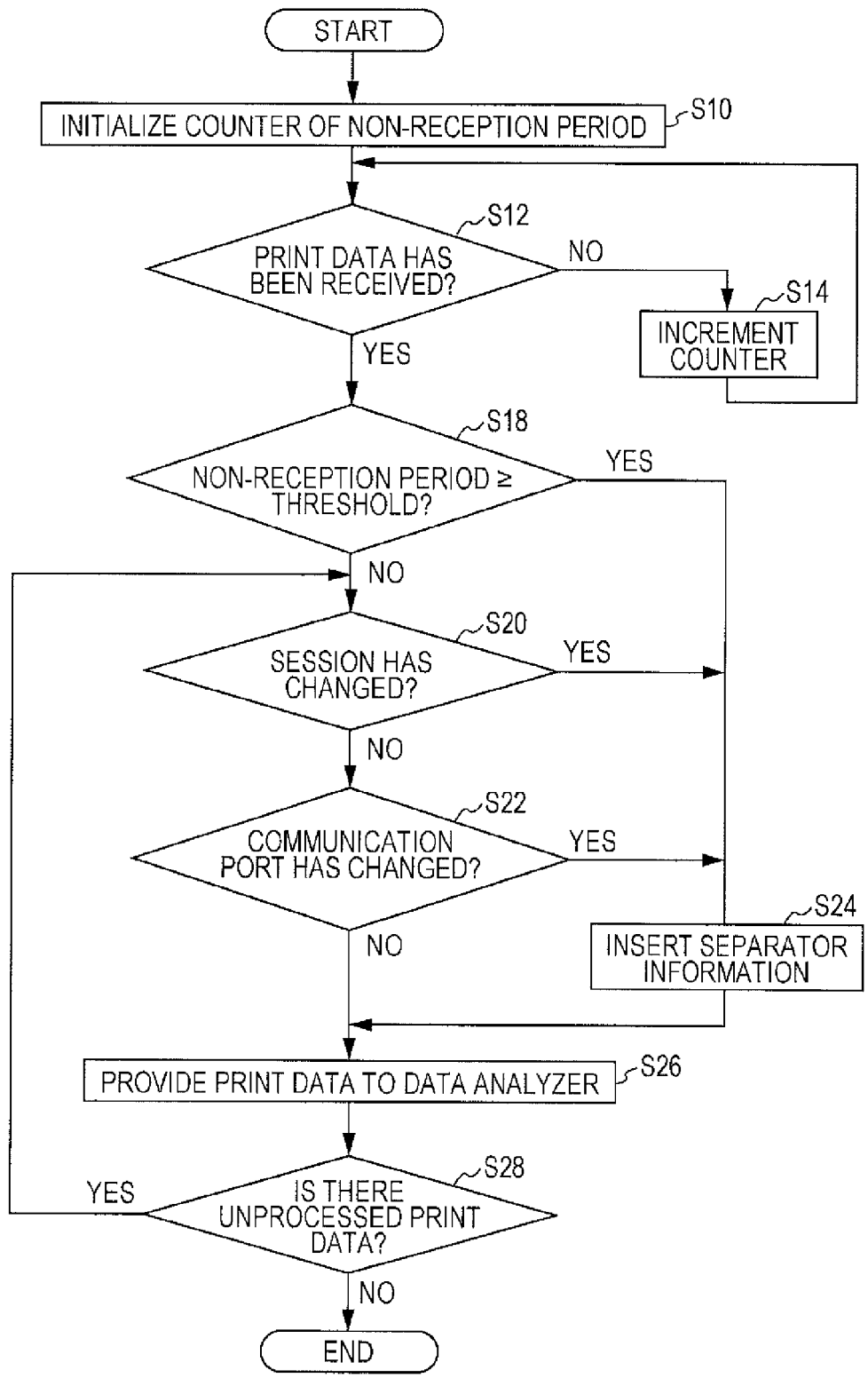
FIG. 2 is a flowchart illustrating an example of a process procedure of a receiver.

Next, an example of a process performed by the receiver 102 (in particular, the separator detector 102a and the separator information inserter 102b) will be described with reference to FIG. 2.

First, when the receiver 102 starts an operation (for example, when the power is turned on), the separator detector 102a initializes a counter of "non-reception period" to 0 (S10). The non-reception period is a time period over which a state where print data is not being received continues starting from a time point when reception of print data from the client apparatus 20 stops. The separator detector 102a determines, at a predetermined determination time interval, whether print data has been received from the client apparatus 20 (S12). If it is determined that print data has not been received, the separator detector 102a increments the counter of the non-reception period, for example, adds the length corresponding to the determination time interval to the value indicated by the counter (S14).

If it is determined in step S12 that print data has been received, the separator detector 102a determines whether or not the value indicated by the counter of the non-reception period at the determination time is equal to or larger than a predetermined threshold (S18). If the determination result is "YES", this means that the time interval between the print data received in step S12 and the print data received the preceding time is so large that both pieces of print data are not regarded as pieces of print data belonging to the same unit (for example, the same copy or the same job), and thus it is determined that there is a separator between both pieces of print data. Accordingly, the separator detector 102a notifies the separator information inserter 102b that a separator has been detected. Then the process proceeds to step S24.

If the determination result in step S18 is "NO", the process proceeds to step S20, where the separator detector 102a determines whether the session of communication with the client apparatus 20 when the print data is received this time in step S12 is a session changed from the session that is used for receiving the print data at the preceding determination in step S20. Whether the session has changed may be determined by inquiring of the operating system of the controller 100 about identification information of the session and determining whether the identification information is different from the identification information of the latest communication session that is stored. Typically, the client apparatus 20 establishes a session with the printer 10 every time it starts transmitting print data of a job and ends the session after transmission of the print data of the job has been completed. Thus, if the sessions for receiving two pieces of print data are different from each other, those pieces of print data are of different jobs and there is a separator between the pieces of print data. Also, the client apparatus 20 may transmit plural copies of print data as different jobs. In this case, a separator of each copy is detectable at the change of a session. If the determination result in step S20 is "YES", the separator detector 102a notifies the separator information inserter 102b that the separator has been detected. Then the process proceeds to step S24.

If the determination result in step S20 is "NO", the process proceeds to step S22, where the separator detector 102a determines whether the communication port used for receiving the print data this time in step S12 among the communication ports included in the controller 100 is a communication port changed from the communication port that is used for receiving the print data at the preceding determination in step S22. Here, the communication port is a connection port for a communication line, such as a LAN port of a network interface card or a USB port. Whether the communication port has changed may be determined by inquiring of the operating system of the controller 100 about the identification information of the communication port that is currently used for receiving the print data and determining whether the identification information is different from the identification information of the preceding communication port that is stored. If the communication ports used for receiving the pieces of print data are different from each other, this means that the pieces of print data are those received from different client apparatuses 20 and are of different jobs. Thus, if the communication port used for receiving print data is different from the communication port at the preceding determination, it may be determined that there is a job separator between the preceding reception and the current reception. Thus, if the determination result in step S22 is "YES", the separator detector 102a notifies the separator information inserter 102b that the separator has been detected. Then the process proceeds to step S24.

In step S24, the separator information inserter 102b inserts preset separator information immediately before the print data received in step S12 (S24) and provides the print data as an insertion result to the data analyzer 110 (S26). That is, if print data is received in step S12, the separator information inserter 102b provides separator information to the data analyzer 110 (S24) and then provides the print data to the data analyzer 110 (S26). For example, the receiver 102 temporarily holds the print data received in step S12 before inputting the print data to the reception buffer, inputs the separator information to the reception buffer if the determination "YES" is performed in any of steps S18, S20, and S22 (S24), and then inputs the temporarily held print data to the reception buffer (S26). The data analyzer 110 sequentially reads the data in the reception buffer from the top and analyzes the data.

If the determination results in all the steps S18, S20, and S22 are "NO", the print data obtained in step S12 is provided to the data analyzer 110 without separator information being inserted thereinto, for example, the print data is added at the end of the reception buffer (S26).

After that, it is determined whether there is unprocessed print data received from the client apparatus 20, for example, whether there is data in the reception buffer (S28). If there is unprocessed print data, the process returns to step S20, and it is determined whether the session or reception port has changed (S20, S22).

The receiver 102 repeats the above-described process until the receiver 202 is brought into a state where print data is not received from any client apparatus 20.

Figure 3:
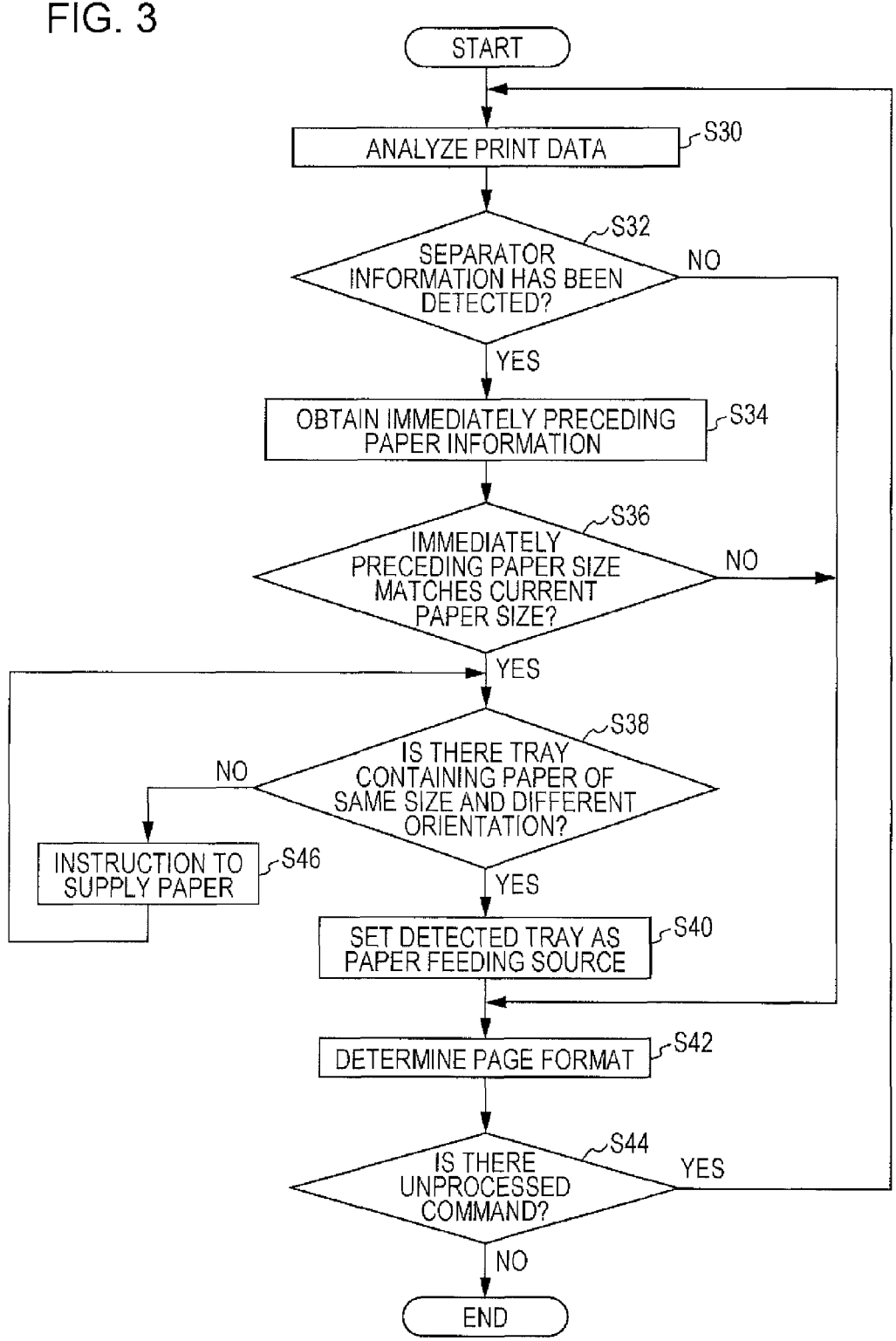
FIG. 3 is a flowchart illustrating an example of a process procedure of a data analyzer.

Next, an example of a process performed by the data analyzer 110 will be described with reference to FIG. 3. The data analyzer 110 starts an operation upon start of reception of print data by the receiver 102, and performs the process illustrated in FIG. 3. The data analyzer 110 sequentially reads the print data (command) from the top of the reception buffer of the receiver 102 and analyzes the print data (S30). The separator information detector 110a determines whether the command analyzed in step S30 is separator information (S32). If the determination result in step S32 is "NO", the process proceeds to step S42, where the data analyzer 110 determines a page format in accordance with an instruction of the print data. If there is an unprocessed command in step S44, the process returns to step S30.

If the determination result in step S32 is "YES", it is determined that the position of the command (separator information) corresponds to a separator of each copy of the print data. In this case, the sort controller 110b obtains paper information (the size, orientation, and so forth of paper) at the time of the command immediately preceding that command (S34). The paper information is necessary to generate print image data and is available because it is managed by the drawing unit 104, for example. The obtained paper information is referred to as "immediately preceding" paper information. Subsequently, the sort controller 110b sequentially obtains, from the reception buffer, a group of commands following the command analyzed in step S30, and obtains paper information from the obtained group of commands. The paper information obtained at this time represents the size and orientation of paper to be used in printing of the "copy" (or "job") that comes after the separator detected in step S32. The paper information obtained at this time is referred to as "current" paper information. The sort controller 110b determines whether or not the paper size represented by the immediately preceding paper information matches the paper size represented by the current paper information (S36). If the sort controller 110b determines that both the paper sizes match, the sort controller 110b determines whether or not there is a paper feed tray that satisfies the condition "containing paper of the same size and different orientation relative to the size and orientation of paper represented by the immediately preceding paper information" (S38). For example, if the paper setting of the first copy that is being printed (or that has been printed) is A4 and SEF and if the paper setting of the second copy after the separator detected in step S32 is A4 and SEF, a paper feed tray containing paper of A4 and LEF is searched for in step S38 (note that the orientation is different from the orientation originally designated in the print data). The size and orientation of the paper contained in individual paper feed trays of the print engine 120 may be determined with reference to the setting information managed by the controller 100.

If there is a paper feed tray that satisfies the condition in step S38 (the determination result in step S38 is YES), the sort controller 110b sets the paper feed tray as a tray serving as a paper feeding source for printing the data after the separator (S40). Also, at this time, the sort controller 110b determines a page format so as to make the coordinate system of drawing performed by the drawing unit 104 identical with the orientation of the paper on the tray that has been set as a paper feeding source (S42). Specifically, if the orientation of the image represented by the print data is identical with the orientation of the paper on the tray that has been set as a paper feeding source, the sort controller 110b determines a page format so that the drawing unit 104 draws the print data after the separator as usual. Otherwise, the sort controller 110b determines a page format so that the drawing unit 104 draws the print data by rotating 90 or 270 degrees the coordinate system for drawing the print data in accordance with the orientation of the paper on the tray. According to steps S40 and S42, the orientation of the paper is changed 90 degrees (or 270 degrees) from LEF to SEF or from SEF to LEF at a detected separator, and the change in the orientation makes the copies before and after the separator sorted from each other.

After the orientation of the paper to be fed is changed in step S42, the sort controller 110b determines whether or not there is a command in the reception buffer of the receiver 102 (S44). If there is a command, the process returns to step S30, where the next command is obtained from the reception buffer and the process similar to that described above is repeated.

If it is determined in step S38 that there is no paper feed tray satisfying the condition, the sort controller 110b suspends the printing process and displays, on the operation panel 108, an instruction to supply paper satisfying the condition in any of the paper feed trays (S46), and the process returns to step S38. If the user supplies the paper in response to the instruction, the determination result "YES" is obtained in step S38 and the process proceeds to step S40.

If the determination result in step S36 is "NO" (not match), the process proceeds to step S42, where the sort controller 110b determines a page format in accordance with the description of the print data. Subsequently, the sort controller 110b determines in step S44 whether or not there is a command in the reception buffer of the receiver 102. If there is a command, the process returns to step S30. In this case, the steps of changing the orientation of paper (S40 and S42) are skipped. If the paper size of the immediately preceding copy (or job) is different from the paper size of the current copy (or job), both copies are easily sorted from each other without changing the paper orientation, and thus the paper orientation is not changed.

As described above, in the exemplary embodiment, a change in a reception condition for receiving print data from the client apparatus 20 is detected as a separator of each copy. In this method, the client apparatus 20 only has to convert document data to print data as usual and does not need to perform a special process of finding a separator position in the print data and inserting special separator information.

In the exemplary embodiment, three conditions are checked: whether a non-reception period is equal to or larger than a threshold (S18), whether a session has changed (S20), and whether a reception port has changed (S22), to detect a change in a reception condition. Each of the conditions defined by steps S18, S20, and S22 alone is not sufficient to perfectly detect a separator of a copy. However, with the three conditions being combined together, detection failure of a separator is reduced compared to the case of using each condition alone.

An exemplary embodiment of the present invention has been described above. The above-described embodiment is merely an example, and various modifications may be accepted within the scope defined by the attached claims.

For example, the printer 10 according to the exemplary embodiment uses a sorting method in which the paper orientation is changed for each copy, but the printer 10 may use another sorting method (for example, a method in which a paper output tray is shifted right and left).

The image content of each "copy" included in print data is not necessarily the same, and the image content of each copy may be partially different, for example, as in mail-merge printing or variable printing.

In the foregoing exemplary embodiment, a description has been given of a separator detection method in the case of sorting print data transmitted as a single job from the client apparatus 20 by separating it into copies. This detection method may be used to detect a separator between jobs, as well as copies. That is, the separator determination command included in the top portion of the first copy of print data also indicates the top of the print data (job), and thus a separator between jobs is also detected by using a method similar to the method according to the above-described exemplary embodiment. For example, in a case where plural jobs for printing data on paper of the same size and same orientation are continuously transmitted from one or plural client apparatuses 20 on a network to the printer 10 without pause, a separator of each job may be detected and the jobs may be sorted through the process according to the above-described exemplary embodiment.

The controller 100 illustrated above is implemented by causing a computer to execute a program representing the functions of the individual devices. Here, the computer has a circuit configuration as hardware in which a microprocessor such as a central processing unit (CPU), a memory (primary storage) such as a random access memory (RAM) and a read only memory (ROM), a controller that controls a fixed storage device such as a hard disk drive (HDD) or a solid state drive (SSD), various types of input/output (I/O) interfaces, and a network interface that performs control to establish a connection to a network such as a local area network (LAN) are connected to one another via a bus or the like. The bus may be connected to, via an I/O interface, for example, a disc drive for reading data from and/or writing data on a portable disc recording medium such as a CD or DVD, a memory reader/writer for reading data from and/or writing data on a portable nonvolatile recording medium of various standards such as a flash memory, and the like. The program describing the processes performed by the above-described functional modules is stored in a fixed storage device such as an HDD and is installed in the computer via a recording medium such as a CD or DVD or via a communication medium such as a network. The program stored in the fixed storage device is read into the RAM and is executed by the microprocessor such as a CPU, and thereby the above-described functional modules are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer configured to printout received print data, the printer comprising:
    a processor and memory configured to operate as:
        a receiver that receives the print data which does not include a separator, the print data comprising at least first sub print data and second sub print data;
        an inserter that, in response to detecting that a first reception condition for receiving the first sub print data is different from a second reception condition for receiving the second sub print data, the inserter is configured to insert separator information between the first sub print data and the second sub print data, and thereby generates print data including the separator information inserted thereinto; and
        a sort controller that, in response to detection of the separator information inserted in the print data, performs control to sort a printout of the first sub print data and the second sub print data, wherein
    the first and second reception conditions are selected from the group comprising: (i) an intermission between receiving the first sub print data and the second sub print data, (ii) a change in session associated with sub print data, and (iii) a change in reception port associated with sub print data.

2. A printing method comprising:
    receiving print data that does not include a separator, the print data comprising at least first sub print data and second sub print data;
    in response to detecting that a first reception condition for receiving the first sub print data is different from a second reception condition for receiving the second sub print data, inserting separator information between the first sub print data and the second sub print data, and thereby generating print data including the separator information inserted thereinto; and in response to detection of the separator information inserted in the print data, performing control to sort a printout of the first sub print data and the second sub print data wherein the first and second reception conditions are selected from the group comprising: (i) an intermission between receiving the first sub print data and the second sub print data, (ii) a change in session associated with sub print data, and (iii) a change in reception port associated with sub print data.

3. A non-transitory computer readable medium storing a program causing a computer to execute a process, the process comprising:

receiving print data that does not include a separator, the print data comprising at least first sub print data and second sub print data;

in response to detecting that a first reception condition for receiving the first sub print data is different from a second reception condition for receiving the second sub print data, inserting separator information between the first sub print data and the second sub print data, and thereby generating print data including the separator information inserted thereinto; and in response to detection of the separator information inserted in the print data, performing control to sort a printout of the first sub print data and the second sub print data wherein the first and second reception conditions are selected from the group comprising: (i) an intermission between receiving the first sub print data and the second sub print data, (ii) a change in session associated with sub print data, and (iii) a change in reception port associated with sub print data.

* * * * *